Sept. 16, 1930.    R. P. LANSING    1,776,036
VEHICLE SPRING CONTROLLER
Filed Jan. 7, 1927    3 Sheets-Sheet 2
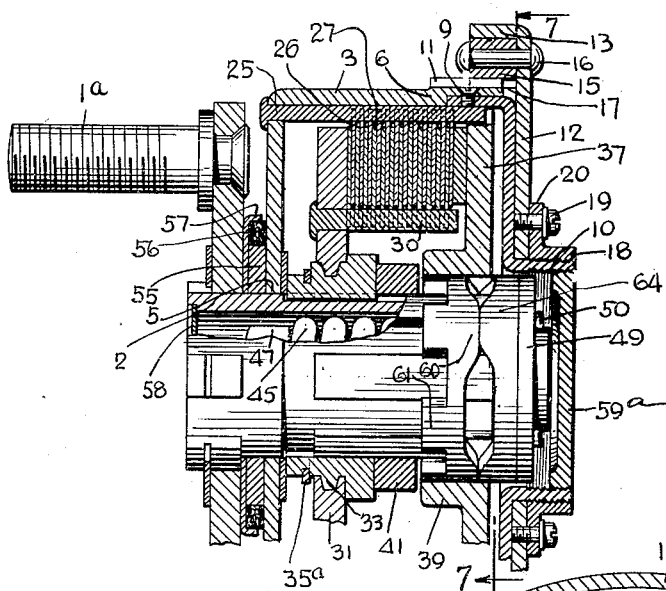
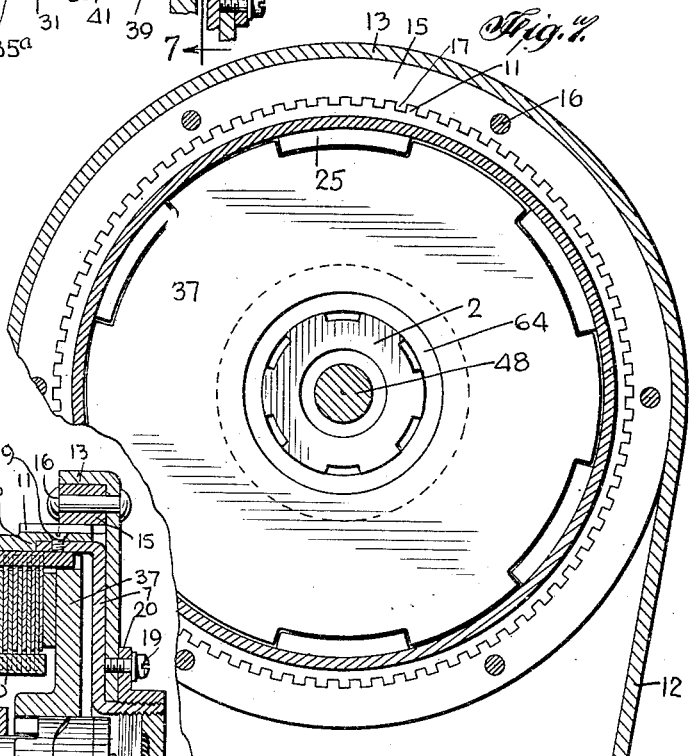
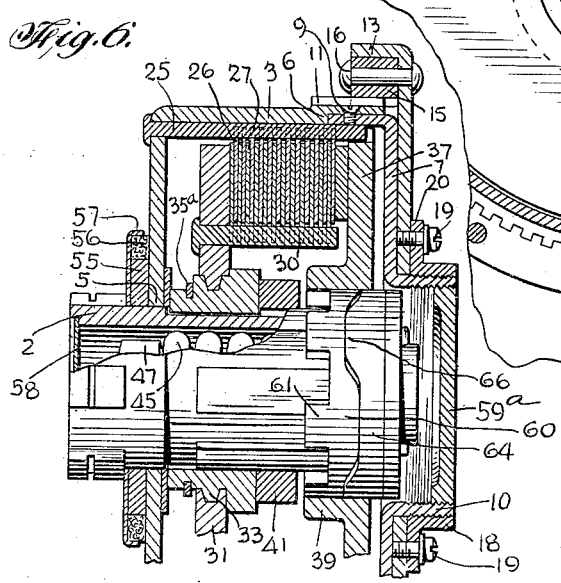
INVENTOR.
Raymond P. Lansing
BY
ATTORNEY Sept. 16, 1930. R. P. LANSING 1,776,036
VEHICLE SPRING CONTROLLER
Filed Jan. 7, 1927 3 Sheets-Sheet 3
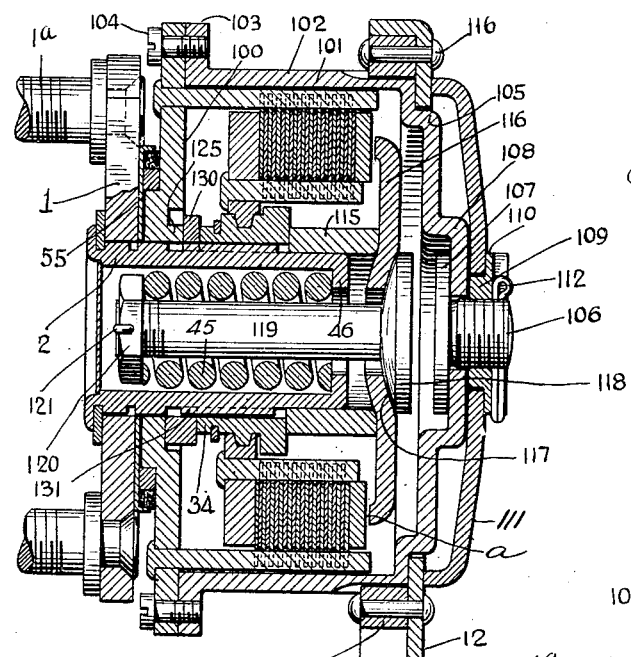
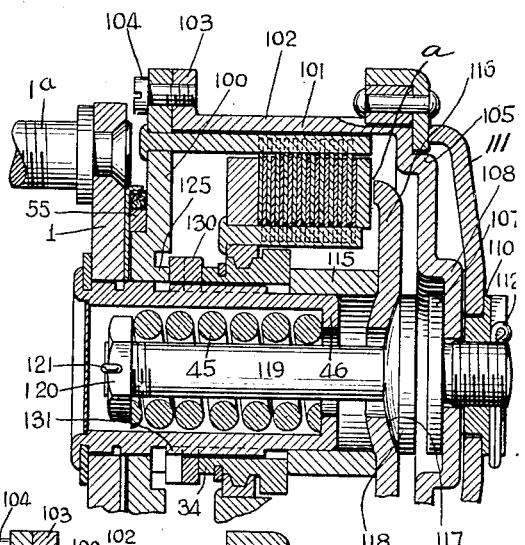
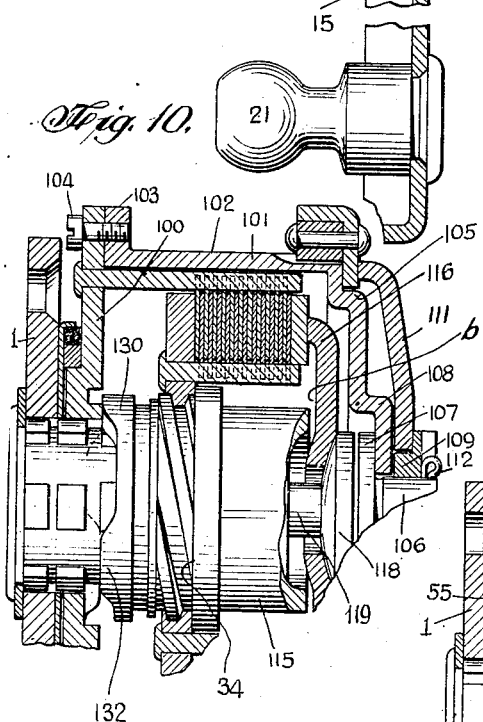
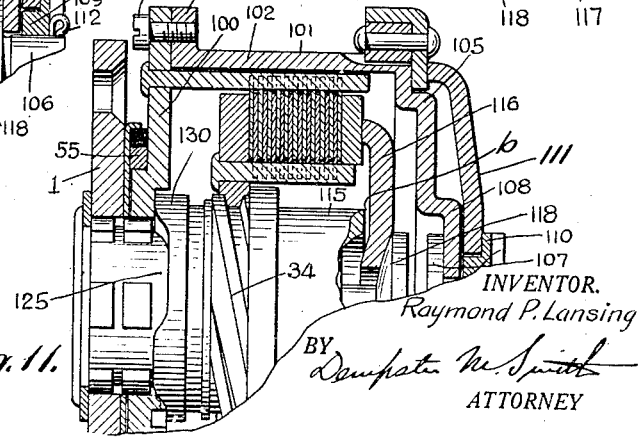
INVENTOR.
Raymond P. Lansing
BY
ATTORNEY Patented Sept. 16, 1930

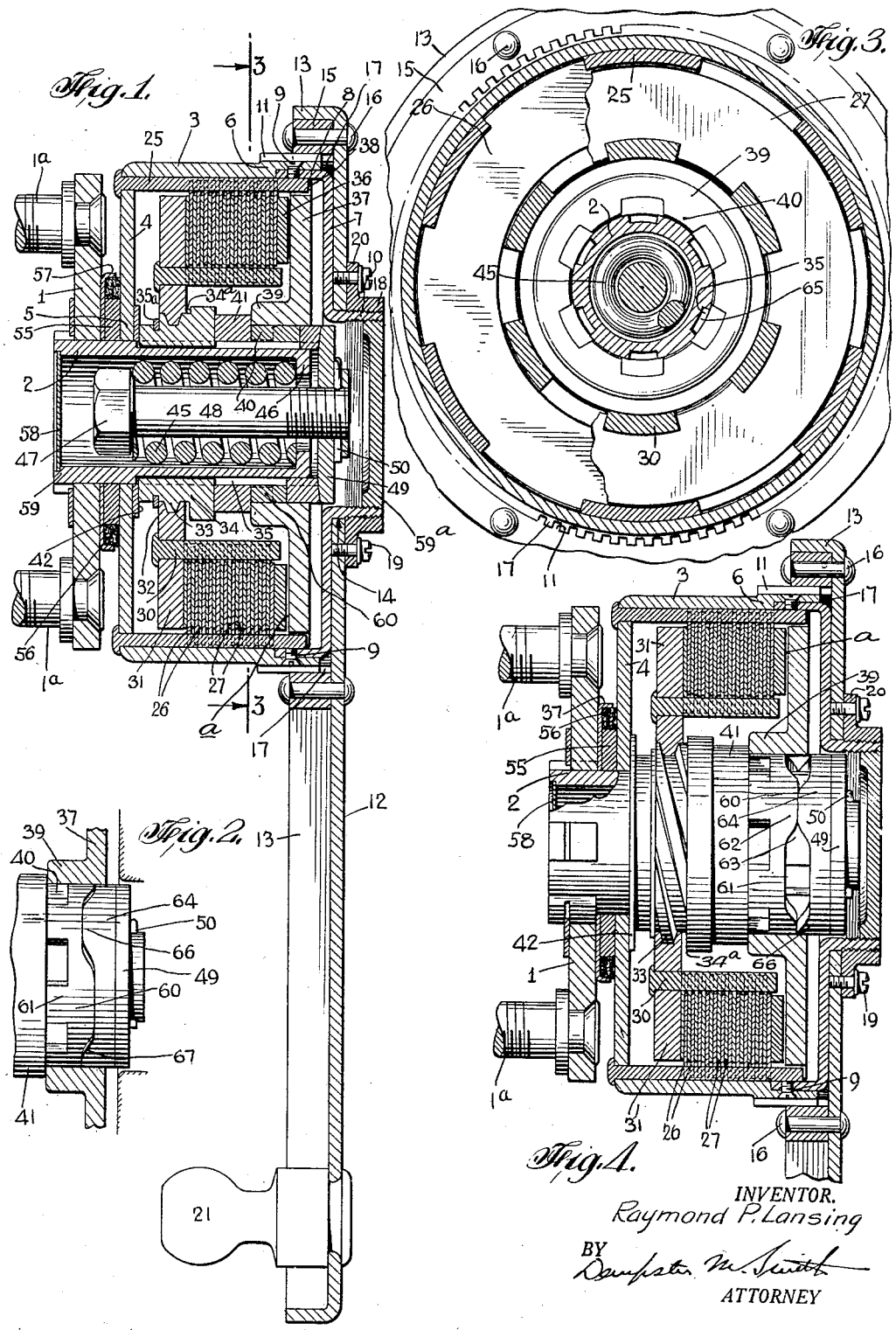

1,776,036

UNITED STATES PATENT OFFICE

RAYMOND P. LANSING, OF MONTCLAIR, NEW JERSEY

VEHICLE SPRING CONTROLLER

Application filed January 7, 1927. Serial No. 159,571.

The invention relates to appliances for controlling the action of vehicle springs.

An important object of the invention is to provide in addition to means for applying the energy of a yieldable pressure member (usually a spring) to produce frictional resistance, means for controlling or varying the effective pressure of the spring or other yieldable member. Otherwise stated, appliances embodying the invention include means for applying spring pressure to produce frictional resistance and distinct means for regulating the effective pressure of the spring. The last named means is usually so designed or adjusted that the spring pressure is reduced to a predetermined extent at a predetermined point in the range of shock absorbing movement so that frictional resistance provided by the appliance is reduced, while the spring pressure applying means is in operative condition.

The operative advantage of this combination or arrangement is that abrupt checking of minor vehicle spring movements is avoided and the checking effect upon greater vehicle spring movements is relieved to a predetermined extent at a predetermined point in such movements, usually at a time when the vericle spring approaches its normal or static position.

Another object is to provide various structural and functional movements in an appliance of this class, as sufficiently explained hereafter.

The accompanying drawings show two physical embodiments of the invention. After considering these examples, skilled persons will understand that many variations may be made within the scope of the appended claims.

In the drawings:

Fig. 1 is a horizontal section of a structure embodying the invention in one form.

Fig. 2 is a detail of the spring regulating cams and adjacent parts.

Fig. 3 is a section at 3—3, Fig. 1.

Fig. 4 is a view, partly in section and partly in plan, showing the parts in a different position from that of Fig. 1.

Fig. 5 is a partial section showing another operative position.

Fig. 6 is a partial section showing still another operative position.

Fig. 7 is a section at 7—7, Fig. 5.

Fig. 8 is a horizontal section of a modified construction.

Fig. 9 is a partial section of the same showing another operative position.

Fig. 10 is a similar section showing another operative position.

Fig. 11 is a similar section showing still another operative position.

Referring first to Figs. 1 to 7:

The base plate 1 has means, such as stud bolts 1ª, for securing it to a vehicle part such as the vertical web of a side frame member of a motor vehicle. A tubular spindle 2 is secured to and projects outward from the base. A rotary structure is arranged to operate about the spindle. This includes a cupped member or casing 3 which has an inner plate 4 apertured to form a bearing at 5 on the spindle, and a cylindrical wall 6. At the open end of the housing or cupped member 3 is a cover plate 7 having a cylindrical peripheral flange 8 secured in a counterbore in wall 6 by rivets or screws 9. The plate also has a central cylindrical projection 10. The outward external margin of wall 6 is provided with teeth 11 similar to gear teeth. A lever arm 12, desirably of pressed sheet metal, has a peripheral flange 13, and an aperture 14 fitting about the cylindrical plate projection 10. An annular locking member or hub 15 is secured to the inner face of the lever, concentric with aperture 14, by suitable means such as rivets 16. The inner face of this locking member is provided with teeth 17 adapted to interfit with teeth 11. This toothed connection between the lever and the rotor casing is to provide for easily applying and securing the lever in the correct angular position after the appliance is secured to the vehicle frame, as sufficiently explained hereafter. The lever is secured in position by a nut 18 engaging a screw thread on the outside of cylindrical extension 10 and the nut may be locked in any convenient way, for example by screws 19 passing through its flange 20 and engaging in threaded holes in the lever web. The outer or free end of the lever has any suitable means, such as the ball fitting 21, to receive a link, the other end of which is connected to a suitable fitting on the vehicle axle.

Secured in housing 3, and desirably located about the inner face of its wall 6, are spaced spline members 25. Any suitable plurality of friction discs 26 are provided, each having spaced lugs interfitting with the spline members 25. These discs are conveniently identified as outer or rotary discs, since their lugs are outwardly placed and they always move in unison with the housing and other parts of the rotary structure.

Other friction discs 27, conveniently identified as inner discs, are interspaced with the outer discs and have on their inner peripheries, lugs interfitting with spaced spline members 30, the inward ends of which are secured in a pressure plate 31. The central aperture of this plate has screw threads 32 of steep pitch, engaging similar male threads 33 on a screw or actuator 34, the bore of which has splines interfitting with splines 35 cut on the outer face of the spindle 2. The screw has a shoulder 34$^a$ to limit outward movement of the pressure plate, and near its inward end it has a snap ring 35$^a$ to limit inward movement of the plate, the shoulder and ring being positioned to allow substantially rotary and axial travel of the plate, for reasons later referred to. The outer face of the pressure plate confronts the inward face of the inner friction disc. A spacing washer or ring 36 is located against the outer friction disc and its outer face confronts the inner face of a pressure abutment plate 37, which may otherwise be identified as a cam plate. The periphery of this plate has spaced lugs or teeth 38 interfitting with the spline members 25 so that the abutment plate always rotates with the housing and other parts of the rotary structure. The central portion of the abutment plate is formed as a cylindrical hub 39 having inwardly projecting jaws or teeth 40. The inward end of this hub is spaced from the outer end of the actuator or screw 34 by a spacing ring 41. The inner end of the screw in effect bears against plate 4 of the housing, or a washer 42 may be interposed, as shown.

A helical spring 45 is located within the hollow spindle and its outer end bears against an abutment flange 46 at the outer end of the spindle. The inward end of the spring bears against the nut head 47 of a screw 48. A spring-retaining and adjusting nut 49 is threaded to adjustably engage the screw thread and is secured in adjusted position by convenient means, such as a cotter pin 50. The normal spring pressure (determined by the adjustment of nut 49) is transferred through the nut and intermediate members, presently to be described, to spacer 41, screw 33 and plate 4 of the housing. To properly take up this spring pressure and at the same time provide for proper rotation of the rotary structure, a suitable thrust bearing is interposed between plate 4 and the base plate 1. The bearing conveniently consists of a disc or ring 55 (which may be of bronze) interposed between plates 4 and 1, and to aid in retaining lubricant and excluding dirt and water, a compressible packing ring 56 of felt or other suitable material, is located about the periphery of the bearing ring and secured in any convenient way, as by a cupped washer or packing retainer 57.

The inner end of the hollow spindle is closed by a disc 58 of thin sheet metal sprung into a shallow counter-bore 59. The cylindrical plate extension 10 is closed by a screw cap 59$^a$, completing the substantially oil-tight and dirt- and waterproof enclosure of all the mechanism.

The structure so far described includes a yieldable pressure member, specifically the spring 45, and means for making it effective to apply friction pressure in at least one direction of movement of arm 12, this means consisting principally of the screw 33 and pressure plate 31, which also may be described as a nut co-operating with the screw. The action of these parts, as later explained, is to apply the spring pressure effectively to the discs which thereupon oppose substantial frictional resistance to arm movement.

An important feature of the invention, as referred to early above, is the provision in connection with the other features mentioned of means for regulating the spring pressure. This means includes, in the present embodiment, cams or analogous devices operatively interposed between pressure abutment plate 37 and the spring actuated nut 49, and such cams therefore constitute in this instance the means for transferring any spring force applied to the nut 49, to spacer 41, screw 33 and plate 4, and then through the thrust bearing to the base plate 1, the outward thrust of the spring counter-balancing the stated inward pressure being taken by abutment flange 46 at the outer end of the spindle.

The spring regulating means just referred to includes an inner, annular cam body 60 revolubly placed about the spindle. At its inward end this member is provided with jaws or lugs 61 interfitting with the jaws or lugs 40 above referred to, which are formed as a part of the pressure abutment plate hub 39. The outward end of the cam member is formed with spaced cams 62, the ends of which are beveled or sloped as at 63. The arcuate lengths of the cams are equal and this length may be varied considerably for different structural or operative reasons. Co-operating with cam body 61 and its cams, is an outer annular cam body 64, the bore of which is cut or provided with teeth or lugs 65 (best shown in Fig. 3) interfitting with the splines 35 on the spindle. The outer cam body is thus connected irrevolubly to the spindle, but arranged for axial movement thereon. The inner face of the annular body is provided with cams 66 which may be of similar formation to the cams 62 and of the same arcuate length. The principal requisite as to cam dimensions and arrangement is that they shall be of such number and arcuate length that the cams on one of the bodies shall intermesh with those on the other when in one rotative position (as shown in Fig. 2), and preferably, with a substantial end clearance between cams of the respective bodies, as indicated at 67, Fig. 2.

When the parts are assembled, as shown in the drawings, with the cams in the intermeshed position, as shown in Fig. 2, and with normal (minimum) spring pressure properly adjusted by adjustment of nut 49, the shock absorber is secured to a vehicle frame member before the lever arm 12 is applied to it. The ball end 21 of the lever is then connected to the vehicle axle by a link of proper length, and the lever is applied to the shock absorber proper, and when so applied is by that act adjusted to the correct angular position for proper operation of the shock absorber. In applying the lever, the teeth 17 of the lever hub ring 15 are intermeshed with the teeth 11 of the casing, and the lever is secured by the lock nut 18. Evidently by providing a large number of interfitting teeth, each tooth being of small arcuate thickness, very little angular movement of the lever is necessary to make the teeth intermesh and therefore the lever is readily applied in the correct angular relation to the shock absorber proper without particular care or attention of the workman.

It is usually considered, in motor vehicle practice, most desirable to control the reaction (or expansion) of the vehicle spring, and in the present embodiments therefore, the instrument is arranged to oppose substantial resistance to such vehicle spring movements and to oppose no resistance, or negligible resistance, to vehicle spring compression. In the following operative description it will therefore be understood that when the actuator and pressure plate screw thread have a right hand lead, as shown, and the lever arm is arranged as shown with relation to the rest of the rotary structure, the arm moves counter-clockwise (as viewed from the right of Figs. 1, 4, 5 and 6) during vehicle spring expansion, and any such movement applies frictional resistance; but evidently by changing the lead of the screw threads or reversing the lever arm, the appliance would oppose resistance to vehicle spring compression.

Fig. 1 shows a substantially idle or neutral position of the parts, corresponding to the normal spacing of the vehicle axle from the frame. For example, when a normal load is on the vehicle frame, and with the shock absorber properly designed and adjusted for the vehicle load and axle spacing, the parts will be in substantially the position of Fig. 1, when the vehicle is at rest. Pressure plate 31 is at or near the inner end of its permitted range of movement, being located near or against the inner stop ring 35$^a$; a small but substantial clearance exists at $a$ between spacing ring 36 and pressure abutment plate 37. The disc pack is therefore free or loose and all of the frictionally acting parts are free from friction pressure. The pressure abutment plate 37 is in its innermost position, with the inner end of its hub 39 resting against spacer 41. Spring 45 is expanded as much as its adjustment by nut 49 will permit, the spring pressure being inactive or self-contained and taken up between spindle abutment 46 and base plate 1 through the interposed parts, including thrust bearing 55, washer 42, screw 33, spacer 41, pressure plate hub 39, the cam bodies 60 and 64, nut 49, spring screw 48 and its head 47. For the present, in explaining the action of what I call the spring pressure applying mechanism (in distinction from the spring regulating mechanism consisting mainly of the cams), the cams 61 and 64 will be considered merely as spacers for maintaining the spring nut 49 at a definite distance from spacer 41 when the spring is in inactive condition with its pressure self-contained or taken up, as in the manner just above explained.

The position of the parts shown in Fig. 1 also is the position which they will occupy at the end of a substantial vehicle spring compression. In such a movement arm 12 has moved clockwise and evidently the extent of such clockwise movement beyond the normal or central axle position will not affect the positions of parts shown in Fig. 1, since any continued clockwise movement of arm 12 will only cause free turning of the outer friction discs in relation to the inner discs. After any such considerable vehicle spring compression, the spring will react or expand with accompanying movement of the axle away from the vehicle frame and in such movement arm 12 moves counter-clockwise.

In the first part of this movement the slight drag or frictional contacts of the discs, and especially the frictional effect of the interposed films of lubricant, causes the pressure plate 31 to move along with the arm and housing until any clearance between the discs is taken up, and in this slight rotation and accompanying outward axial movement of the pressure plate the disc pack and spacing ring 36 are moved outward until the clearance at $a$ is taken up and the spacing ring is in contact with the pressure abutment plate 37. The continued rotation of the pressure plate then brings the spring pressure to bear upon the disc pack and this pressure causes the discs and pressure plate to rotate together and the stated parts also move further out axially, and in this movement the pressure abutment plate acting through the interposed spacers (cam bodies) moves the spring nut outward and additionally compresses the spring. Substantial power is required for this spring compression and thus during the stated range of movement, which may conveniently be called the spring wind-up period, a substantial resistance is afforded to arm movement. At the end of this spring wind-up period, the pressure plate comes in contact with stop shoulder 34ª on the screw and further rotation and axial movement is prevented, and thereafter the arm continues to move to the end of the stated vehicle spring movement with accompanying slippage of the outer friction discs in relation to the inner discs and with full spring pressure applied to produce the predetermined substantial frictional resistance to arm movement and checking of the vehicle spring reaction, this resistance being constant except for the changing angularity of the arm, which may be disregarded for present purposes.

In the structure as so far described, the resistance to vehicle spring recoil will continue in full effect up to the end of such recoil movement; also, full checking resistance will be afforded to slight recoil movements occurring, for example, when the vehicle is running over nearly smooth roads and the application of this full frictional resistance will cause unduly abrupt checking and a rough-riding effect in some cases. The spring regulating or adjusting means, specifically in this instance the cams, will now be described, and their effect in reducing the friction resistance toward the end of a long recoil movement and in preventing abrupt checking of short recoil movements, will be explained.

In the substantially neutral position of Fig. 1, the cams 60 and 66 are intermeshed, as shown in Fig. 2; that is, each cam is located in a low spot or inter-cam space of the opposite cam body; cam body 64 and spring nut 49 which engages it are therefore in their inward positions and spring 45 is expanded to the greatest extent that the adjustment of nut 49 permits; or, as otherwise stated, the spring is under a certain minimum pressure. When any considerable vehicle spring compression occurs, with accompanying clockwise movement of arm 12, cam body 61 turns with the pressure abutment plate 37 by reason of their jaw connection, and the abutment plate turns with the arm by reason of its connection to splines 25. After the slight angular cam clearance is taken up, the slant faces of the cams engage and the outer cam body 64 is forced outward, moving nut 49 outward and additionally compressing spring 45 to an extent proportional to the angular movement, until if the vehicle spring compression is considerable, the cams reach the position of Fig. 4 with their crests or lands in engagement with each other. Cam body 64 is then in its outermost position and spring 45 is compressed to the maximum extent for which the spring regulating means is designed and adjusted. A certain effort is, of course, required to compress the spring and to this extent the stated vehicle spring compression movement is resisted or retarded, and in this way the appliance affords a desirable slight or moderate checking of vehicle spring compression. This resistance need not, however, be large because of the angularity of the cam faces, and in some cases this checking effect is insignificant. The appliance is then positioned as shown in Fig. 4, ready for an ensuing vehicle spring recoil. During this recoil, the spring pressure applying and friction producing devices, namely, the pressure plate co-operating with the screw, the friction discs and the pressure abutment plate, operate as above described, that is, after the clearance at $a$ is taken up, the pressure abutment plate is moved outward and the spring is additionally compressed, with resistance to arm movement caused by the work required for spring compression, this spring compression being additional to that afforded by the cam action as just above explained. Then when the pressure plate encounters the stop shoulder 34ª and frictional slippage between the discs commences, the maximum spring pressure is applied to the discs to produce frictional resistance to the recoil movement. This maximum resistance continues until cam body 61, rotating with the pressure abutment plate, reaches such a position that its cam and cams 66 of the other cam body commence to intermesh, that is, the outer cams being to ride down the slant faces of the inner cams with accompanying inward movement of the outer cam body 64, and with proportional reduction of the spring pressure, until the parts reach the position of Fig. 6, when the cams again completely intermesh; the spring pressure is relaxed to the full extent permitted by the spring regulating mechanism, but frictional slippage with reduced spring pressure continues until the end of the stated recoil movement. This reduction of spring pressure provides for relaxation of the frictional retardation, and the cams are usually so adjusted that the reduction of spring pressure and of frictional resistance commences as the axle approaches its normal or neutral position. In this way abrupt checking of short recoils is prevented, and in longer recoils the frictional resistance is relaxed as the axle approaches neutral position and only a reduced frictional resistance is afforded to further movement of the axle, beyond the neutral position.

Evidently the cams may be differently arranged or proportioned and differently positioned or adjusted to give various operative effects, too numerous for detailed description. Such variations of structure or arrangement will be understood by skilled persons.

Figs. 8 to 11 show a modified construction in which the spring regulating cams are located inwardly of the actuator, and other structural changes are included as noted hereafter.

The base plate and spindle are substantially the same as in the other example. The housing of the rotary structure includes an inner plate 100, revolubly mounted about the spindle, and a thrust bearing is interposed between this plate and the base plate, as in the previous example. The housing is completed by an outer cup-shaped member 101, the cylindrical wall 102 of which has at its inner, open, end, a flange 103 secured to plate 100 by screws 104. The outer or closed end of the cupped member is formed with a shoulder 105 to center the lever arm 12, which has a ring-shaped hub 15, provided with teeth to engage tooth formations on the housing, for the purpose of readily adjusting or securing the lever in position, as in the previous example. The lever in this instance is, however, secured in position by a screw 106 having a broad head 107 engaged within a countersink 108 in the end wall of the housing. A locking nut 109 engaging the screw, has a flange 110 engaging a locking plate 111, which in turn overlies the lever arm and holds it in position. The nut 109 may be located in any convenient way, as by a cotter pin 112.

The arrangement of splines, pressure plate and friction discs and the outer spacing ring or washer, are substantially as in the previous example, the parts are similarly numbered. In the present structure or arrangement, however, the cams for regulating the spring pressure, are, as above stated, located inwardly with respect to the screw or actuator 34 and because of that arrangement the actuator has a spline connection with the spindle, not only to keep it from rotating, but to permit axial movement of the actuator on the spindle. A spacing sleeve 115 is located between the outer end of the actuator and the pressure abutment plate 116, which, in this example, has a central, part-spherical socket 117 in which is engaged the part-spherical head 118 of a screw 119 on the inner end of which is threaded a nut 120 engaging the inner end of the spring 45. The spring is arranged substantially as in the previous example, that is, with its outward end engaging a shoulder 46 on the spindle, and its inner end engages the nut 120. The normal or minimum pressure of the spring is adjusted by turning the nut 120, to which access may be had when the inner spindle closure plate 58 is removed. Usually this adjustment is necessary only in the original assembly of the appliance and before the closure plate is inserted. The adjustment of nut 120 is maintained by any convenient locking means, such as the cotter pin 121.

The inward one of the spring regulating cams, or rather the series of spaced cam formations 125, which together constitute the inward cam structure, are in this example conveniently formed integrally with the central portion of plate 100, about its bearing aperture. To co-operate with these cam formations an outer cam body 130 is provided, having teeth or splines 131 to co-operate with the spindle splines, and on its inner face the cam body has spaced cam formations 132 to co-operate with cams 125, substantially as explained in connection with the regulating cams in the previous example. Cam body 130 is interposed between the inner end of the actuator, and the cam formations on plate 100.

The operation of this form of the invention is substantially the same as in the previous example, except, that in the spring regulating or adjusting action, caused by rotation of plate 100 and its cam members 125 in relation to cams 132 on cam body 130, the actuator 34 and all parts which co-operate with it are moved bodily outward. That is to say, when arm 12 moves clockwise during a vehicle spring compression, the consequent rotation of plate 100 causes cam body 130 to move axially outward and at the same time the actuator, pressure plate, disc pack, spacing ring and pressure abutment plate 116 are moved outward to additionally compress or energize the spring. In this outward movement, the teeth or lugs of the outer friction discs slide at their spline members. It will be evident that such outward movement of the stated parts does not in any way affect the application of spring pressure to the friction discs since such application can be effected only by oscillation of arm 12 in the other direction. At the end of such a vehicle spring compression movement the cams and other parts are positioned as in Fig. 9. When the vehicle spring recoils, the action is the same as in the previous example. The clearance at $a$ is first taken up and then during further rotation of the arm in the counter-clockwise direction and accompanying further rotation of the pressure plate upon the actuator, the spring is additionally compressed, and finally the parts are positioned as in Fig. 10. The full compression of the spring is indicated by the clearance at $b$ between the outer end of the spacer 115 and the pressure abutment plate 116. The arm continues to move counter-clockwise to the end of the recoil stroke, with accompanying slippage of the friction discs, at first under full spring pressure, and then as the cams commence to mesh together in turning toward the position of Fig. 11, the spring pressure is progressively relieved with consequent reduction of the frictional resistance, and finally at the end of such a recoil movement the parts are shown as in Fig. 11, with the cams fully meshed, and with the cam body 130 in its inward position. In going to that position of course, the rotary parts including the actuator, the pressure plate, disc pack and pressure abutment plate have moved inward, but the clearance is still maintained at $b$ by reason of the fact that the spring-pressure-applying means is still in active condition. In an ensuing vehicle spring compression arm 12 will move clockwise, and that movement causes the pressure plate to rotate and move axially inward, relieving the discs of friction pressure and reestablishing clearance at $a$.

I claim:—

1. An appliance of the class described comprising relatively movable members, friction means, a yieldable pressure member, means for applying the pressure member to produce friction, and means acting during movement of said relatively movable members for regulating effective pressure so applied.

2. An appliance of the class described comprising relatively movable members, friction means, a yieldable pressure member, means for applying the pressure member to produce friction and means acting during movement of said relatively movable members for varying the effect of the pressure member.

3. An appliance of the class described comprising a friction member, another relatively revoluble friction member, a yieldable pressure member, means acting during movement of a friction member in one direction to apply the pressure of the pressure member to produce frictional resistance, and means acting during a rotative movement to regulate the effective pressure of the pressure member.

4. An appliance of the class described comprising a friction member, another relatively revoluble friction member, a yieldable pressure member, means acting during movement of a friction member in one direction to apply the pressure of the pressure member to produce frictional resistance, and means acting during a rotative movement to vary the effective pressure of the pressure member.

5. An appliance of the class described comprising a friction member, another relatively revoluble friction member, a spring, means acting during a rotary movement to apply the spring to produce friction pressure, and means acting during a rotary movement to vary the effective spring pressure while the spring is still in active and pressure-applying condition.

6. An appliance of the class described comprising a friction member, another relatively revoluble friction member, a spring, means acting during a rotary movement to apply the spring to produce friction pressure, and spring-regulating means acting during a rotary movement in one direction to compress the spring whereafter the increased spring pressure is applied by action of the spring-applying means, said regulating means acting during a rotation in the other direction to relax the spring pressure and so to reduce frictional resistance while the spring-applying means is still in active condition.

7. An appliance of the class described comprising relatively revoluble friction members, a spring, spring pressure applying means including relatively movable angular members acting in one direction of rotation to apply spring pressure to the friction members, and additional spring-pressure-regulating means effective in normal operation to vary the spring pressure.

8. An appliance of the class described comprising relatively revoluble friction members, a spring, spring pressure applying means including relatively movable angular members acting in one direction of rotation to apply spring pressure to the friction members, and means acting during a rotary movement to vary the effective spring pressure.

9. An appliance of the class described comprising relatively revoluble friction members, a spring, spring pressure applying means including relatively movable angular members acting in one direction of rotation to apply spring pressure to the friction members, and spring regulating means comprising relatively revoluble angular members and connections by which said members during a rotary movement vary the effective spring pressure.

10. An appliance of the class described comprising a base, a spindle extending therefrom, an actuator thereon, a spring, friction plates, and means co-operating with the actuator to apply spring pressure to the plates for producing frictional resistance to rotary movement, and additional spring regulating means acting during a rotary movement to vary the effective spring pressure.

11. An appliance of the class described comprising a base, a spindle extending therefrom, an actuator thereon, a spring, friction plates, and means co-operating with the actuator to apply spring pressure to the plates for producing frictional resistance to rotary movement, and relatively fixed and rotary cam members acting during rotary movement to vary the effective spring pressure.

12. An appliance of the class described comprising a base, a spindle extending therefrom, an actuator thereon, a spring, friction plates, and means co-operating with the actuator to apply spring pressure to the plates for producing frictional resistance to rotary movement, and relatively fixed and rotary cam members acting during rotary movement in one direction to compress the spring and in rotary movement in the other direction to relax the spring pressure and so to reduce the effective pressure on the friction members.

13. A vehicle spring controller comprising relatively revoluble main members, friction means operatively intermediate the members, a spring, means acting upon relative movement of said members to compress the spring and apply its pressure to the friction means, and regulating means acting in a part of the stated movement to change the pressure value of the spring.

14. An appliance of the class described comprising a base adapted for connection to a vehicle part, a relatively rotary structure, a pressed sheet metal lever arm, means for securing it to the rotary structure, and a separate toothed ring connected to the arm and engaging teeth on the rotary structure to admit irrevoluble connection of the lever to said structure in different angular positions.

15. A shock absorber comprising friction means, pressure-applying means, and automatically acting pressure-regulating means.

16. A shock absorber comprising relatively rotatable friction elements, a spring, means for applying spring-force to said elements, and automatically acting means for varying the effective spring-force while said first named means is still in active condition.

17. A vehicle spring controller comprising relatively revoluble main members, friction means operatively intermediate the members, a spring maintained in compression and operatively ineffective in a neutral position of said members, means acting upon relative movement of the members in one direction to additionally compress the spring and apply its pressure to the friction means, and means acting during such movement to reduce the spring pressure while it is still effective.

18. An appliance of the class described comprising a base, a spindle extending therefrom, a spring, an actuator mounted about the spindle, friction means including a pressure member having angular revoluble connection with the actuator, an abutment connected with the spring, and relatively fixed and movable members having angular cooperating surfaces and arranged during a relative movement of parts of the friction means to vary the effective spring pressure.

19. An appliance of the class described comprising a base, a spindle extending therefrom, a spring, an actuator mounted about the spindle, friction means including a pressure member having angular revoluble connection with the actuator, a structure including a lever arm and revoluble about the spindle, an abutment for the friction means connected to rotate with said structure, means operatively connecting the spring and the abutment, and relatively fixed and movable cams acting during a movement of said structure to vary the axial position of the abutment and thereby change the effective spring pressure.

20. An appliance of the class described comprising a base plate, a tubular spindle projecting therefrom, a structure mounted for rotation about the spindle and having a lever arm, an actuator mounted about the spindle, a pressure plate having a screw connection with the actuator, a pressure abutment plate connected to the rotary structure, friction means intermediate the pressure and abutment plates, a cam connected to rotate with the pressure abutment plate about the spindle, another cam arranged for axial and non-rotative movement, a spring within the spindle reacting at one end against the spindle, and means for applying pressure from the other end of the spring to the non-rotative cam.

Signed at New York, in the county of New York and State of New York, this 6th day of January A. D. 1927.

RAYMOND P. LANSING.